United States Patent
Fabregas et al.

(10) Patent No.: US 9,293,991 B2
(45) Date of Patent: Mar. 22, 2016

(54) APPARATUS AND METHOD FOR AGE-COMPENSATING CONTROL FOR A POWER CONVERTER

(71) Applicant: Lear Corporation, Southfield, MI (US)

(72) Inventors: Antoni Ferre Fabregas, Valls (ES); David Gamez Alari, Valls (ES); Federico Giordano, Valls (ES)

(73) Assignee: Lear Corporation, Southfield, MI (US)

( * ) Notice: Subject to any disclaimer, the term of this patent is extended or adjusted under 35 U.S.C. 154(b) by 87 days.

(21) Appl. No.: 14/036,207

(22) Filed: Sep. 25, 2013

(65) Prior Publication Data

US 2014/0097812 A1 Apr. 10, 2014

Related U.S. Application Data

(60) Provisional application No. 61/710,165, filed on Oct. 5, 2012.

(51) Int. Cl.
*G01R 31/02* (2006.01)
*H02M 3/158* (2006.01)

(52) U.S. Cl.
CPC ............ *H02M 3/158* (2013.01); *H02M 3/1584* (2013.01)

(58) Field of Classification Search
CPC . G09G 3/3233; G09G 3/2003; H02M 3/1584; H02M 3/158; H02M 7/493; H02J 3/383; H02J 7/35; G01R 31/2635; G01R 3/2855
USPC .......... 345/45, 76–78, 82; 307/43, 64, 66, 87, 307/52; 323/222, 258, 266, 272, 282
See application file for complete search history.

(56) References Cited

U.S. PATENT DOCUMENTS

| 6,018,200 | A | * | 1/2000 | Anderson et al. ........... 290/40 B |
| 6,362,608 | B1 | | 3/2002 | Ashburn et al. |
| 6,965,219 | B2 | | 11/2005 | Brooks et al. |

(Continued)

FOREIGN PATENT DOCUMENTS

| CN | 101595519 A | 12/2009 |
| CN | 101841245 A | 9/2010 |

(Continued)

OTHER PUBLICATIONS

German Office Action for corresponding German Application No. 10 2013 220 125.7, mailed Sep. 10, 2014, 8 pages.

(Continued)

*Primary Examiner* — Rajnikant Patel
(74) *Attorney, Agent, or Firm* — Brooks Kushman P.C.

(57) ABSTRACT

In at least one embodiment, an apparatus for providing age-compensation control for a power converter is provided. The apparatus comprises a controller for being coupled to a power converter including a plurality of phases for converting a first input signal into a first output signal. The controller is configured to activate at least one first switch for a first phase from the plurality of phases for converting the first input signal into the first output signal. The controller is further configured to determine an aging condition for the at least one first switch for the first phase based on an equivalent time, Teq of the at least one first switch, wherein Teq corresponds to an amount of time the at least one first switch is active and on an operating temperature of the at least one first switch while the at least one first switch is active.

13 Claims, 4 Drawing Sheets

(56) References Cited

U.S. PATENT DOCUMENTS

| | | |
|---|---|---|
| 7,023,188 B1 | 4/2006 | Rice |
| 7,109,691 B2 | 9/2006 | Brooks et al. |
| 7,355,574 B1 | 4/2008 | Leon et al. |
| 7,689,377 B2* | 3/2010 | Jain .................. H03L 1/00 257/48 |
| 7,692,329 B2* | 4/2010 | Abu Qahouq et al. .......... 307/14 |
| 7,852,053 B2* | 12/2010 | Martin et al. ................. 323/272 |
| 8,077,123 B2* | 12/2011 | Naugler, Jr. .................... 345/76 |
| 8,242,787 B2* | 8/2012 | Hente ................ G01R 31/2635 324/500 |
| 8,248,739 B2 | 8/2012 | Farr |
| 9,081,397 B2 | 7/2015 | Jiang et al. |
| 2008/0116455 A1 | 5/2008 | Jain et al. |
| 2011/0080151 A1 | 4/2011 | Rahardjo et al. |
| 2012/0297036 A1* | 11/2012 | Frank et al. ................... 709/221 |

FOREIGN PATENT DOCUMENTS

| | | |
|---|---|---|
| CN | 102035176 A | 4/2011 |
| CN | 102647074 A | 8/2012 |
| EP | 1793505 A2 | 6/2007 |

OTHER PUBLICATIONS

Chinese Office Action for corresponding Application No. 201310464810.8, mailed Sep. 21, 2015, 5 pages.

\* cited by examiner

APPARATUS AND METHOD FOR AGE-COMPENSATING CONTROL FOR A POWER CONVERTER

CROSS-REFERENCE TO RELATED APPLICATIONS

This application claims the benefit of U.S. provisional Application No. 61/710,165 filed on Oct. 5, 2012, the disclosure of which is incorporated in its entirety by reference herein.

TECHNICAL FIELD

Embodiments disclosed herein generally related to an apparatus and method for controlling an operation for one or more switches in a power converter to compensate for aging.

BACKGROUND

It is known to provide a multi-phase switching converter. One example of such an implementation is disclosed in U.S. Pat. No. 6,362,608 ("the '608 patent") to Ashburn et al.

The '608 patent discloses multi-phase switching converters and methods that provide fast response and low ripple on the converter inputs and outputs. The converters include multiple converter stages that are normally operated in sequence into a common load. However, upon sensing that operation of one of the converter stages does not bring the converter back into regulation, multiple converter stages are operated until regulation is reestablished, after which the converter stages are operated in sequence again. In the embodiment disclosed, upon sensing that operation of one of the converter stages does not bring the converter back into regulation, all converter stages are operated until regulation is reestablished, after which the converter stages are operated in sequence again starting with the stage with the lowest inductor current.

SUMMARY

In at least one embodiment, an apparatus for providing age-compensation control for a power converter is provided. The apparatus comprises a controller for being coupled to a power converter including a plurality of phases for converting a first input signal into a first output signal. The controller is configured to activate at least one first switch for a first phase from the plurality of phases for converting the first input signal into the first output signal. The controller is further configured to determine an aged condition for that the at least one first switch for the first phase based on an equivalent time, Teq of the at least one first switch, wherein Teq corresponds to an amount of time the at least one first switch is active and on an operating temperature of the at least one first switch while the at least one first switch is active.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein.

Figure 1:
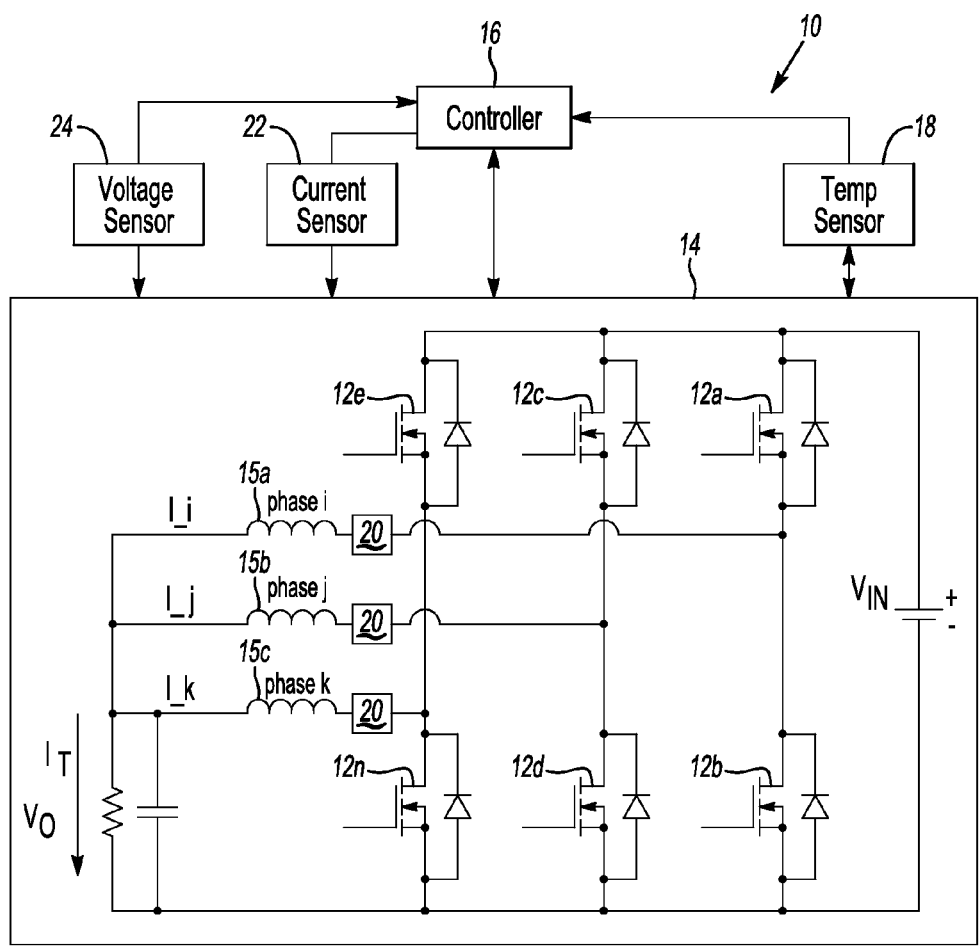
FIG. 1 depicts a system for controlling an operation of one or more switches in a power converter in accordance to embodiment.

FIG. 1 depicts a system (or apparatus) 10 for controlling an operation of one or more switches 12a-12n ("12") (or phases) in a power converter 14 in accordance to embodiment. The system 10 comprises a controller 16 that is operably coupled to the power converter 14 for activating/deactivating one or more of the switches 12. It is recognized that the power converter 14 may be used in connection with a vehicle for purposes of charging one or more vehicle batteries (not shown). In one example, the power converter 14 may be implemented as a 3-phase power converter (e.g., buck circuit). In one example, the power converter 14 may be an interleaved power converter that utilizes a parallel architecture, in which many quasi-autonomous converters, such as phases, are implemented in parallel to create a single large power converter.

The switches 12 may each be implemented as a metal-oxide-semiconductor field effect transistor (MOSFET) or other suitable device. In general, in order to increase efficiency, a different number of phases (e.g., i, j, k, etc.) may be activated depending on the total current ($I_T$) flowing through the power converter 14. In other words, at different times, the power converter 14 may have, but not limited to, one, two or three, phases working. As such, the system 10 may equalize the use of all phases in order to keep all phases or switches 12 with similar wear. For a multiphase converter, a phase is generally defined as one portion of the circuit that is placed between an input and a load and copies of such a circuit are placed in parallel with one another between the input and the load. As such, each phase may be activated at equally spaced intervals over a switching frequency. In reference to FIG. 1, each phase is generally defined as one or more switches that are generally coupled together with a respective inductor 15. For example, phase i generally comprises inductor 15a, switch 12a and switch 12b, phase j generally comprises inductor 15b, switch 12c and switch 12d, and phase k generally comprises inductor 15c, switch 12e and switch 12n. It is contemplated that each phase may include additional or less components than those shown in FIG. 1 and that the phases depicted in FIG. 1 are provided for illustrative purposes.

It is contemplated that the overall use for each phase (or aging of each phase) may be determined based on the overall time that each phase has been operational at specific operating conditions.

For example, an "equivalent operating time" Teq may be defined as:

$$Teq = \Sigma \Delta t \cdot Ea / [k_B \cdot (T_{J\_MAX} - T_J)] \quad (Eq. 1)$$

where Teq is computed at some interval times $\Delta t$ (normally with same duration) for each phase, Teq is generally defined as the time in which a switch 12 is operating at a given temperature and is generally indicative of the aging of the switch 12;

where Ea is a constant, defined as activation energy that generally provides an indication of the effect that the operating conditions (temperature, etc.) has on the life of the one or more of the switches 12;

where k is the Boltzmann constant;

where $T_{J\_MAX}$ is a maximum junction temperature that a switch 12 can withstand, such information may be provided by a manufacturer data sheet;

where $T_J$ is the actual junction temperature of the switch 12 and is calculated as:

$$T_J = T_{ambient} + R_{TH} * P_D \quad (Eq. 2)$$

where $T_{ambient}$ is the ambient temperature near a printed circuit board (PCB) of the power converter 14, which may be obtained via temperature sensor 18 positioned about each switch 12, $R_{TH}$ is the component thermal resistance for the switch 12 (which may depend on the type of switch or the PCB which may be further determined based on such factors and may also be determined experimentally), and $P_D$ is the power dissipated in conduction computed using measured voltages and currents. For example, a shunt 20 may be positioned about one or more of the switches 12 to enable one or more current sensors 22 to measure the current across one or more of the switches 12 when such switches 12 are active. In addition, one or more voltage sensors 24 are used to measure Vin (an input voltage) and Vout (an output voltage). The controller 16 may determine $P_D$ based on such measured current and voltage values. As a first approximation, Pd may be further defined or estimated as $P_D = P_{ON} + P_{SW}$. In which, $P_{ON}$ is generally defined as the conduction losses when the switch 12 is ON and $P_{SW}$ is generally defined as the power dissipated when the switch 12 is switching. $P_{ON}$ and $P_{SW}$ may be obtained by virtue of the voltage and current measurements noted above in addition to design/component parameters information.

Figure 2:
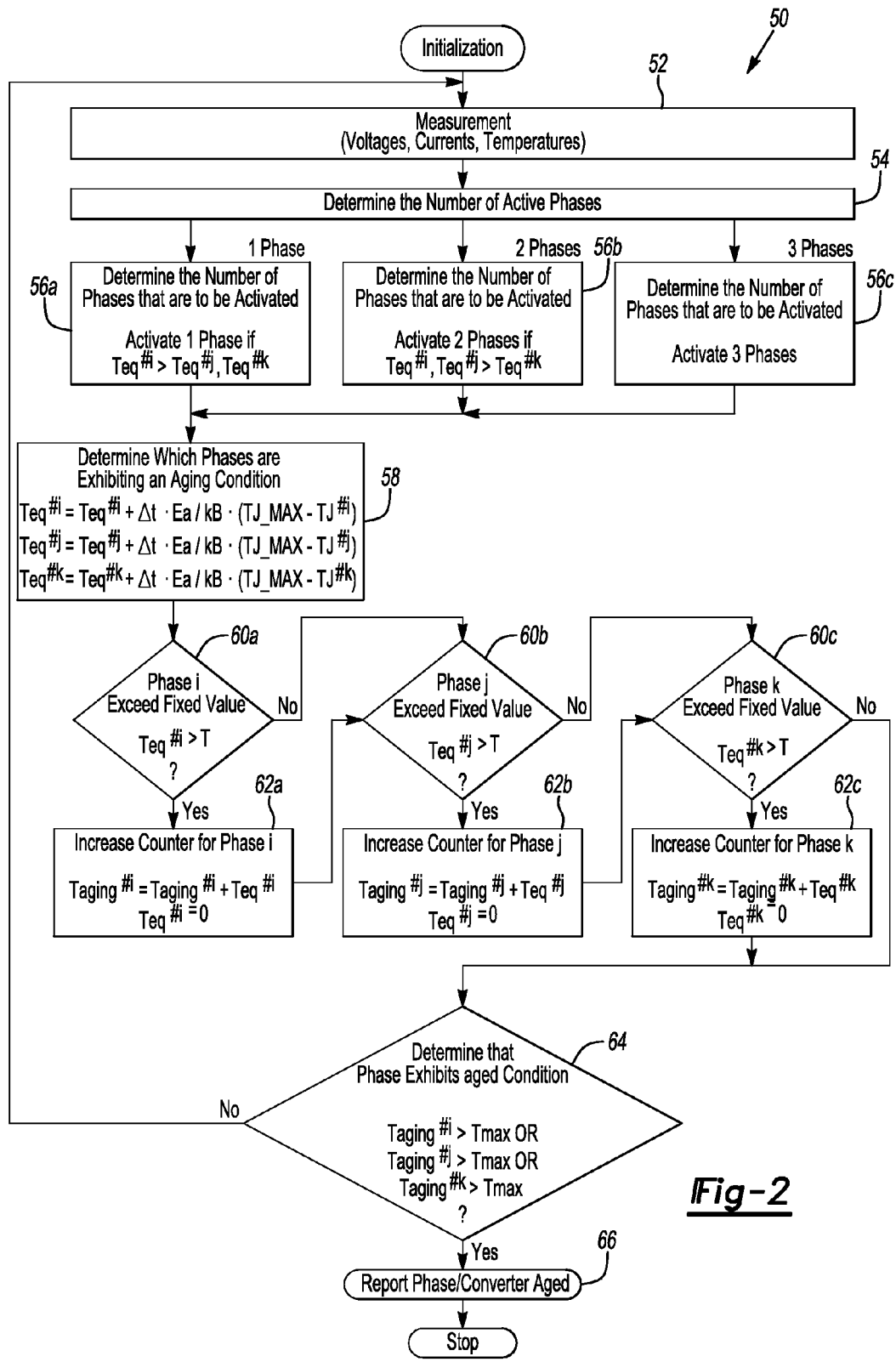
FIG. 2 depicts a method for controlling the operation of the one or more switches in the power converter in accordance to embodiment.

FIG. 2 depicts a method 50 for controlling the operation of the one or more switches 12 in the power converter 14 in accordance to embodiment.

In operation 52, the controller 16 determines all voltages (at the input and output of the converter 14 (e.g., Vin and Vo)), currents (for each phase) and temperature (e.g., ambient temperature is obtained near the switches 12) are measured.

In operation 54, the controller 16 determines the number of phases that are to be activated. In general, any number of algorithms may be provided for determining the number of phases that are to be activated.

Figure 3:
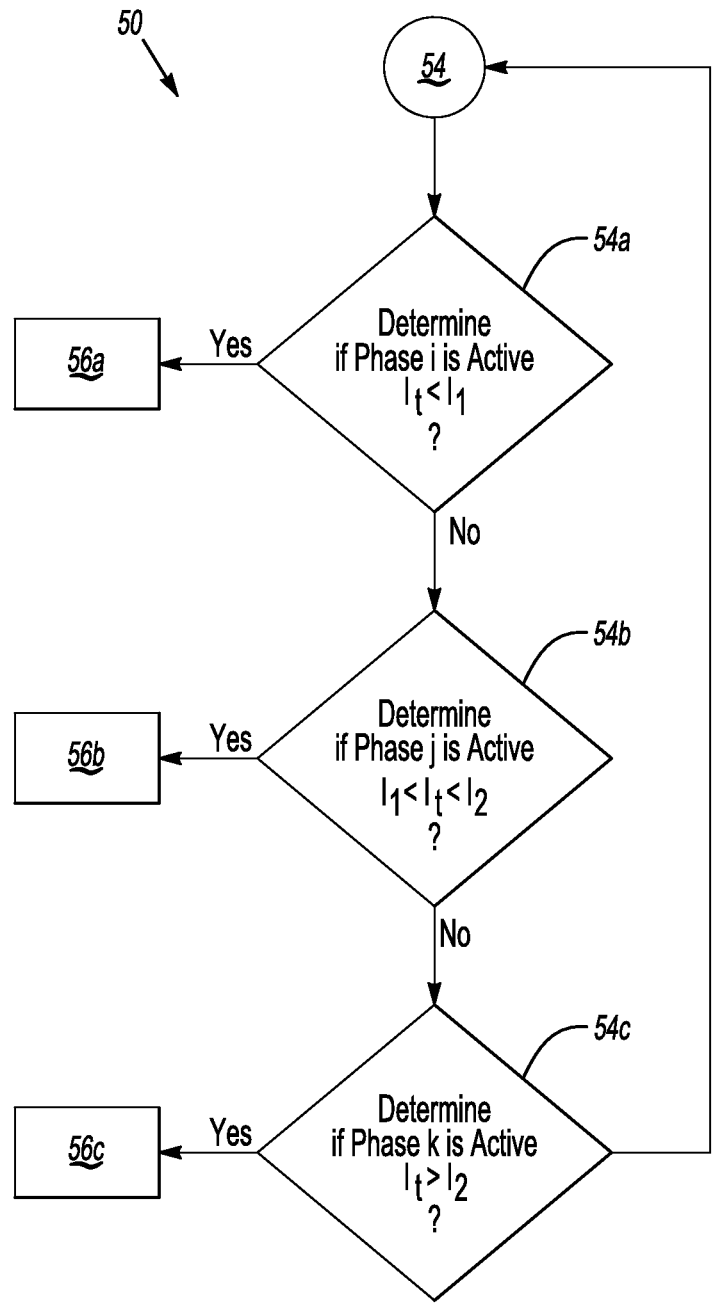
FIG. 3 depicts a method for setting a number of active phases in accordance to one embodiment.

One algorithm includes a current sharing scheme. This scheme includes in the activation, one phase (of N phases) for each Nth fraction of total output current ($I_T$). The example of the manner in which the controller 16 determines the number of phases is set forth in FIG. 3 which will be explained in more detail below.

For instance, the power converter 14 (e.g., DC/DC converter) with 3 phases may have an output current (e.g., $I_T$) that is limited to a maximum value of, for example, 36A ($I_{max}$). Each phase generally provides or contributes to a portion of the maximum current value $I_T$.

In operation 54a, the controller 16 determines whether the output current $I_T$ is less than a first predetermined current ($I_1 = I_{max}/3$) (e.g., 12A). If this condition is true, then the method 50 sets the number of active phases to 1 and proceeds to operation 56a. If this condition is not true, then the method 50 proceeds to operation 54b.

In operation 54b, the controller 16 determines whether the output current $I_T$ is greater than the first predetermined current ($I_1$ where $I_1 = I_{max}/3$) (e.g., 12A) and less than a second predetermined current ($I_2$ where $I_2 = I_{max}*2/3$) (e.g., 24A). If this condition is true, then the method 50 sets the number of active phases to 2 and proceeds to operation 56b. If this condition is not true, then the method 50 proceeds to operation 54c.

In operation 54c, the controller 16 determines whether the output current $I_T$ is greater than the second predetermined current ($I_2$) (e.g., 24A). If this condition is true, then the method 50 sets the number of active phases to 3 and proceeds to operation 56c. If this condition is not true, then the method 50 proceeds to operation 54a.

Executing operations 54a, 54b, and 54c enable the system 10 to determine the number of phases that are actives at any loop.

Figure 4:
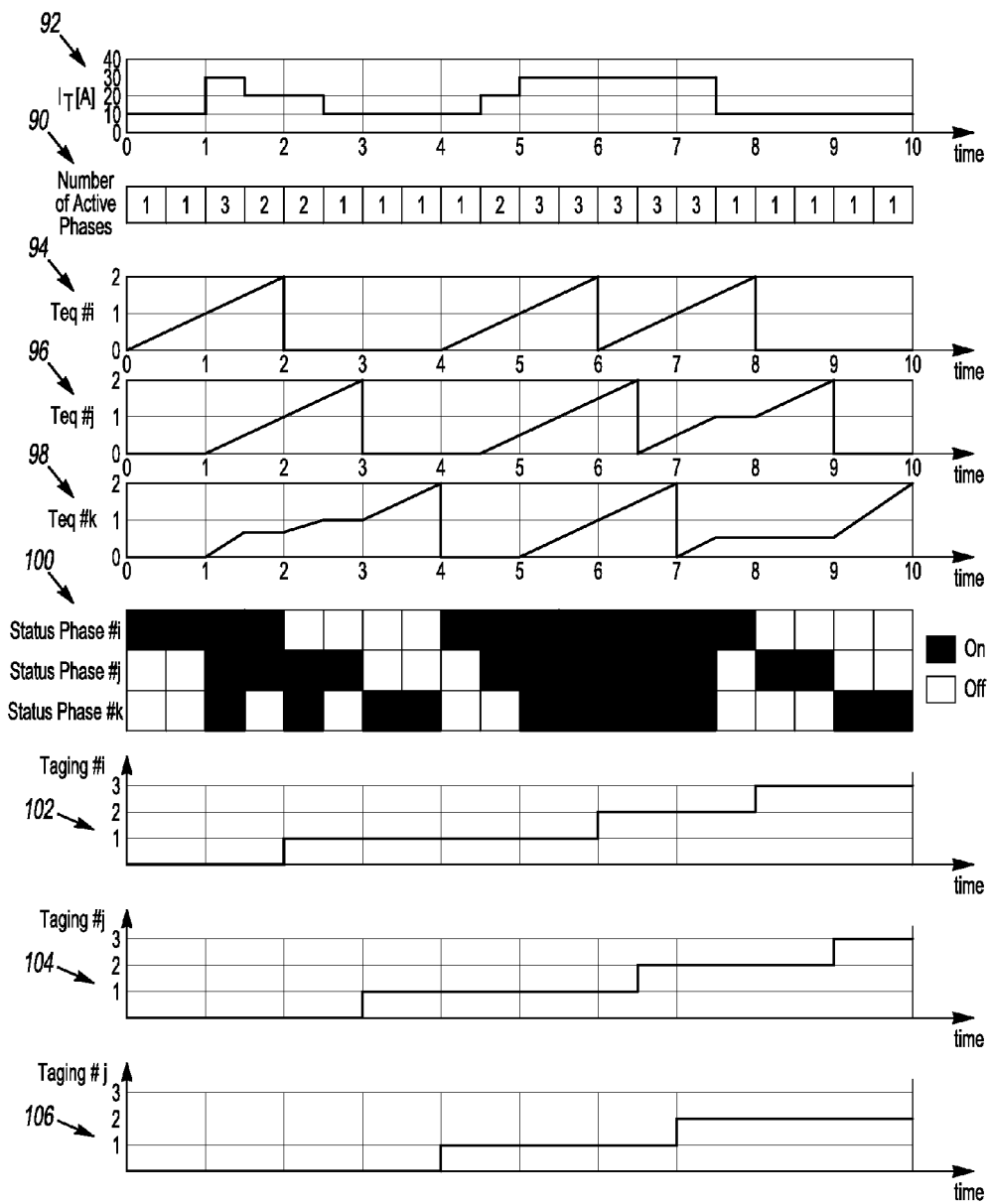
FIG. 4 depicts various waveforms corresponding to aspects of the system in accordance to one embodiment.

FIG. 4 depicts waveforms 90 and 92 which indicate the phases that are activated based on the aging condition of each phase.

In reference to FIG. 2, in operation 56a, the controller 16 activates only one phase.

In operation 56b, the controller 16 activates two phases.

In operation 56c, the controller 16 activates three phases.

In operation 58, the controller 16 determines the aging of the phases (e.g., i, j, and/or k) (i.e., for operations 56a, 56b, and 56c). To perform this operation, the "equivalent operating time" (Teq) for each phase is periodically computed and accumulated in a variable. The determination of which phases are aging is set forth in more detail in connection with operations 60a-60c, 62a-62c, and 64. The variable for each phase as shown in connection with FIG. 2 may be defined as $Teq^{\#i}$, $Teq^{\#j}$, and $Teq^{\#k}$. If the phase is working at high power and/or high temperature, this variable (i.e., Teq) will increase faster while, if the phase is working at low power and/or low temperature, this variable (i.e., Teq) will increase slowly.

In operation 60a, the controller 16 determines whether Teq for phase i (or $Teq^{\#i}$) exceeds a first fixed value. If this condition is true, then the method 50 moves to operation 62a. If not, then the method 50 moves to operation 60b.

In operation 60b, the controller 16 determines whether Teq for phase j (or $Teq^{\#j}$) exceeds a second fixed value. If this condition is true, then the method 50 moves to operation 62b. If not, then the method 50 moves to operation 60c.

In operation 60c, the controller 16 determines whether Teq for phase k (or $Teq^{\#k}$) exceeds a third fixed value. If this condition is true, then the method 50 moves to operation 62b. If not, then the method 50 moves to operation 60c.

The operations of 62a, 62b, and 62c correspond to when the value of the accumulated $Teq^{\#i}$, $Teq^{\#j}$, and/or $Teq^{\#k}$ variable is higher than the first fixed value, the second fixed value, and/or the third fixed value, respectively. It is recognized that the first fixed value, the second fixed value, and the third fixed value may be similar to one another or different than one another. With the operations of 62a, 62b, and 62c, the corresponding phase that exceeds the fixed value is stopped (e.g., see $Teq^{\#i}=0$, $Teq^{\#j}=0$, $Teq^{\#k}=0$) or until other phases reach this value or all phases are needed. As an example, waveforms 94, 96, 98, and 100 as shown in FIG. 4 shows the evolution over time of these variables for the output current described and using T=2 (or fixed value=2).

In addition to the operations of 62, 62b, and 62c being indicative of each time the accumulated $Teq^{\#i}$, $Teq^{\#j}$, and/or $Teq^{\#k}$ variable reaches the first, second, and/or third fixed values (or T), respectively, such operations also indicate that a counter named Taging (e.g., $Taging^{\#i}$, $Taging^{\#j}$, or $Taging^{\#k}$) is increased by the value stored in the accumulated $Teq^{\#i}$, $Teq^{\#j}$, and/or $Teq^{\#k}$ variable. As such, the counter, Taging may store "normalized" information on the aging of each phase. Waveforms 102, 104, and 106 depict examples of values as stored in corresponding counters $Taging^{\#i}$, $Taging^{\#j}$, or $Taging^{\#k}$.

In operation 64, the controller 16 determines whether the values in any one or more the corresponding counters $Taging^{\#i}$, $Taging^{\#j}$, or $Taging^{\#k}$ exceed a predefined maximum threshold $T_{MAX}$. If this condition is true, then the method 50 moves to operation 66. If not, then the method 50 moves back to operation 52.

In operation 66, the controller 16 reports out or transmits data indicating that one or more of the phases in the power converter 14 has reached a maximum aged status (or maximum aged condition) and that the corresponding switch within the phase that exhibits the maximum aged condition will stop operating.

It is recognized that if the junction temperature of a particular switch 12 in a phase reaches a maximum operating junction temperature, the "equivalent operating time" (Teq) goes to ∞, thereby indicating that the switch 12 will be destroyed (or rendered inoperable) (see operations 64 and 66). With the proposed method 50, it may be assured that all phases will have a similar Taging. As noted in connection with operation 66, if one of the phases reaches a predefined threshold $T_{MAX}$, the system 10 may report that the power converter 14 (or phase) has reached the maximum "AGED" status and its corresponding switch(s) 12 may be stopped. The maximum AGED status generally indicates that a phase has been operating for a large amount of time at stressed conditions of temperature and/or current.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for providing age-compensation control for a power converter, the apparatus comprising:
    a controller for being operably coupled to a power converter including a plurality of phases for converting a first input signal into a first output signal, the controller being configured to:
        activate at least one first switch for a first phase from the plurality of phases for converting the first input signal into the first output signal;
        determine an aging condition for the at least one first switch for the first phase based on an equivalent time, Teq of the at least one first switch, wherein Teq corresponds to an amount of time the at least one first switch is active and on an operating temperature of the at least one first switch while the at least one first switch is active;
        deactivate the first phase in response to the at least one first switch exhibiting a maximum aged condition;
        compare the Teq to a first fixed value prior to determining that the at least one first switch is exhibiting the maximum aged condition, and
        store a value corresponding to Teq in a counter if Teq exceeds the first fixed value.

2. The apparatus of claim 1 wherein the controller is further configured to compare the value in the counter to a first predefined maximum threshold.

3. The apparatus of claim 2 wherein the controller is further configured determine that the at least one first switch exhibits the maximum aged condition in response to the value in the counter exceeding the first predefined maximum threshold.

4. The apparatus of claim 1 wherein the controller is further configured to activate the at least one first switch for the first phase and at least one second switch form a second phase of the plurality of phases based on an desired output current of the power converter to equalize the manner in which the first phase and the second phase are used.

5. An apparatus for providing age-compensation control for a power converter, the apparatus comprising:
    a controller for being operably coupled to a power converter including a plurality of phases for converting a first voltage signal into a second voltage signal, the controller being configured to:
        activate at least one first switch for a first phase form the plurality of phases for converting the first voltage signal into the second voltage signal;
        determine an aging condition for the at least one first switch for the first phase based on an equivalent time, Teq of the at least one first switch, wherein Teq corresponds to an amount of time the at least one first switch is active and on an operating temperature of the at least one first switch while the at least one first switch is active; and
        activate the at least one first switch for the first phase and at least one second switch from a second phase of the plurality of phases based on an desired output current of the power converter to equalize the manner in which the first phase and the second phase are used.

6. The apparatus of claim 5 wherein the controller is further configured to deactivate the first phase in response to the at least one first switch exhibiting a maximum of aged condition.

7. The apparatus of claim 6 wherein the controller is further configured to compare the Teq to a first fixed value prior to determining that the at least one first switch is exhibiting the maximum aged condition.

8. The apparatus of claim 7 wherein the controller is further configured to store a value corresponding to Teq in a counter if Teq exceeds the first fixed value.

9. The apparatus of claim 8 wherein the controller is further configured to compare the value in the counter to a first predefined maximum threshold.

10. The apparatus of claim 9 wherein the controller is further configured determine that the at least one first switch exhibits the maximum aged condition in response to the value in the counter exceeding the first predefined maximum threshold.

11. A method for providing age-compensation control for a power converter, the method comprising:
- converting, with a power converter including a plurality of phases, a first voltage signal into a second voltage signal;
- activating at least one first switch for a first phase from the plurality of phases for converting the first voltage signal into the second voltage signal;
- determining an aging condition for the at least one first switch for the first phase based on an equivalent time, Teq of the at least one first switch, wherein Teq corresponds to an amount of time the at least one first switch is active and on an operating temperature of the at least one first switch while the at least one first switch is active;
- deactivating the first phase in response to the at least one first switch exhibiting a maximum aged condition;
- comparing the Teq to a first fixed value prior to determining that the at least one first switch is exhibiting the maximum aged condition; and
- storing a value corresponding to Teq in a counter if Teq exceeds the first fixed value.

12. The method of claim 11 further comprising comparing the value in the counter to a first predefined maximum threshold.

13. The method of claim 12 further comprising determining that the at least one first switch exhibits the maximum aged condition in response to the value in the counter exceeding the first predefined maximum threshold.

* * * * *

UNITED STATES PATENT AND TRADEMARK OFFICE
CERTIFICATE OF CORRECTION

PATENT NO. : 9,293,991 B2  
APPLICATION NO. : 14/036207  
DATED : March 22, 2016  
INVENTOR(S) : Antoni Ferre Fabregas et al.

Page 1 of 1

It is certified that error appears in the above-identified patent and that said Letters Patent is hereby corrected as shown below:

In the Claims

Column 6, Lines 21-22, Claim 3:  
After "controller is further configured"  
Insert -- to --.

Column 6, Line 27, Claim 4:  
After "at least one second switch"  
Delete "form" and  
Insert -- for --.

Column 6, Line 28, Claim 4:  
After "plurality of phases based on"  
Delete "an" and  
Insert -- a --.

Column 6, Line 37, Claim 5:  
After "for a first phase"  
Delete "form" and  
Insert -- from --.

Column 6, Line 49, Claim 5:  
After "phases based on"  
Delete "an" and  
Insert -- a --.

Column 6, Line 67, Claim 10:  
After "further configured"  
Insert -- to --.

Signed and Sealed this  
Seventh Day of June, 2016

Michelle K. Lee  
*Director of the United States Patent and Trademark Office*